US010393019B2

(12) United States Patent
Duong

(10) Patent No.: US 10,393,019 B2
(45) Date of Patent: Aug. 27, 2019

(54) ASSEMBLY AND METHOD FOR INFLUENCING FLOW THROUGH A FAN OF A GAS TURBINE ENGINE

(71) Applicant: Pratt & Whitney Canada Corp., Longueuil (CA)

(72) Inventor: Hien Duong, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 430 days.

(21) Appl. No.: 15/222,307

(22) Filed: Jul. 28, 2016

(65) Prior Publication Data
US 2018/0030893 A1 Feb. 1, 2018

(51) Int. Cl.
| F02C 7/04 | (2006.01) |
| F04D 29/32 | (2006.01) |
| F04D 29/54 | (2006.01) |
| F04D 29/68 | (2006.01) |
| F01D 5/14 | (2006.01) |

(52) U.S. Cl.
CPC ............. *F02C 7/04* (2013.01); *F01D 5/145* (2013.01); *F04D 29/321* (2013.01); *F04D 29/329* (2013.01); *F04D 29/542* (2013.01); *F04D 29/545* (2013.01); *F04D 29/684* (2013.01); *F05D 2220/32* (2013.01); *F05D 2220/36* (2013.01); *F05D 2240/12* (2013.01); *F05D 2260/60* (2013.01); *Y02T 50/673* (2013.01)

(58) Field of Classification Search
CPC ........ F02C 7/04; F04D 29/321; F04D 29/329; F04D 29/542; F04D 29/545; F04D 29/684
See application file for complete search history.

(56) References Cited

U.S. PATENT DOCUMENTS

| 4,485,619 | A | * | 12/1984 | Moore | F02C 7/047 415/175 |
| 4,722,666 | A | | 2/1988 | Dennison et al. | |
| 8,667,774 | B2 | | 3/2014 | Kuehn et al. | |
| 8,667,775 | B1 | | 3/2014 | Kisska et al. | |
| 9,062,566 | B2 | | 6/2015 | Suciu et al. | |
| 2013/0259638 | A1 | * | 10/2013 | Suciu | F02C 7/047 415/1 |
| 2013/0259687 | A1 | * | 10/2013 | Suciu | F01D 25/12 416/1 |

FOREIGN PATENT DOCUMENTS

GB 2038425 A * 7/1980 .............. F02C 7/04

OTHER PUBLICATIONS

Canadian Intellectual Property Office, Office Action dated Apr. 20, 2018 re: Canadian Application No. 2,964,988.
Ching, T. L., Flow Control of an Airfoil via Injection and Suction, Journal of Aircraft, Jan.-Feb. 2009, vol. 46, No. 1, USA.

* cited by examiner

*Primary Examiner* — Craig Kim
(74) *Attorney, Agent, or Firm* — Norton Rose Fulbright Canada LLP

(57) ABSTRACT

Assemblies and methods for providing injection air to influence flow in a flow passage defined by a fan of a gas turbine engine are disclosed. In one embodiment, the method comprises: receiving air into an interior of a nose cone; increasing the pressure of the air in the interior of the nose cone and directing the pressurized air; and discharging the air into the flow passage defined by the fan.

19 Claims, 6 Drawing Sheets

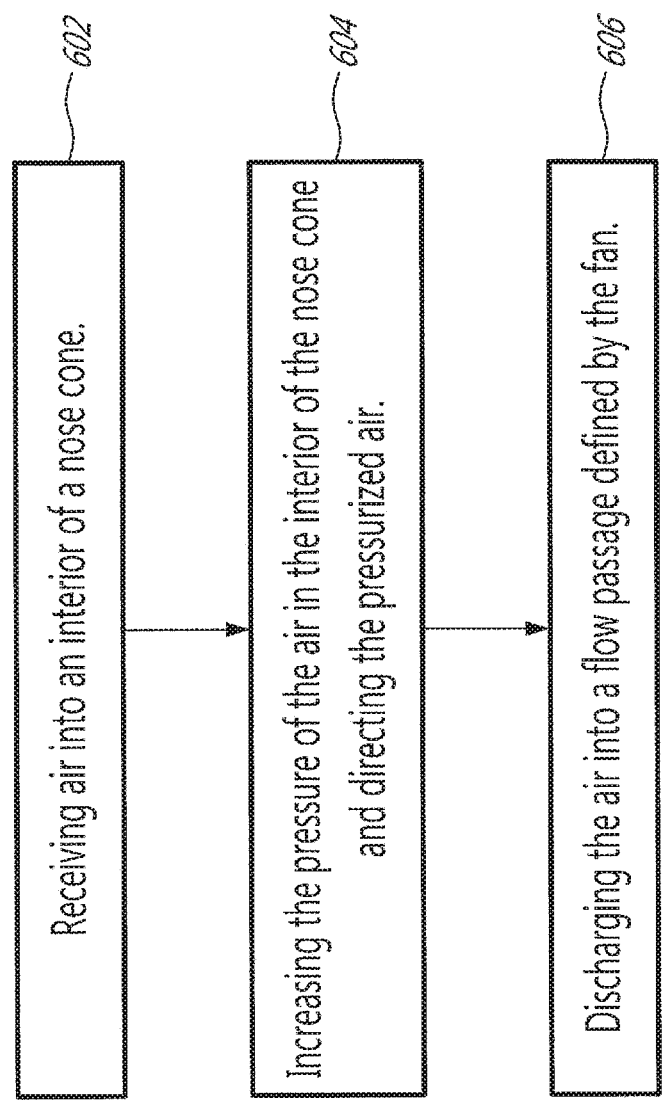

ASSEMBLY AND METHOD FOR INFLUENCING FLOW THROUGH A FAN OF A GAS TURBINE ENGINE

TECHNICAL FIELD

The disclosure relates generally to flow control, and more particularly to influencing flow in a flow passage defined by a fan of a turbofan engine.

BACKGROUND OF THE ART

An inlet fan of a turbofan gas turbine engine uses mechanical energy from the gas turbine to accelerate air rearwards into a core of the engine and into a duct that bypasses the core of the engine. The design and performance of the fan can play an important role in the overall efficiency of the engine. Improvement in the design of inlet fans to improve the efficiency of turbofan gas turbine engines is desired.

SUMMARY

In one aspect, the disclosure describes a fan assembly for a turbofan engine. The fan assembly comprises:

a fan comprising a plurality of circumferentially distributed fan blades extending from a hub, the fan blades and the hub defining a flow passage through which ambient air is propelled;

a nose cone disposed upstream of the hub and having an interior in fluid communication with the ambient air; and a pump at least partially housed in the interior of the nose cone, the pump being configured to, using the ambient air in the nose cone, drive injection air into the flow passage defined by the fan blades and the hub to influence flow in the flow passage.

The hub may define one or more injection passages for directing injection air from the pump to one or more locations in the flow passage.

The one or more injection passages may comprise one or more respective openings formed in an outer surface of the hub.

The pump may comprise a plurality of rotor blades secured for common rotation with the fan.

The pump may comprise a circular array of the rotor blades.

The plurality of rotor blades may be secured to an inner surface of the outer wall of the nose cone.

The pump may comprise a first stage including a first circular array of the rotor blades and a second stage including a second circular array of the rotor blades. The second stage may be disposed downstream of the first stage.

The pump may comprise a circular array of stator guide vanes disposed between the first stage of rotor blades and the second stage of rotor blades.

The hub may at least partially define a collection chamber for receiving the injection air from the pump. The collection chamber may be disposed upstream of the one or more injection passages.

The pump may define an annular flow passage that is at least partially defined by an inner surface of the outer wall of the nose cone.

The pump may be configured to drive injection air to a root region of the one or more fan blades.

The pump may be configured to drive injection air to a location upstream of the one or more fan blades.

In another aspect, the disclosure describes a gas turbine engine comprising:

an inlet fan for propelling ambient air, the inlet fan comprising a plurality of circumferentially distributed fan blades extending from a hub, the fan blades and the hub defining a flow passage through which ambient air is propelled;

a nose cone disposed upstream of the hub and having an interior in fluid communication with the ambient air; and a pump at least partially housed in the interior of the nose cone, the pump being configured to, using the ambient air in the nose cone, drive injection air into the flow passage defined by the fan blades and the hub to influence flow in the flow passage;

a compressor for pressurizing the air propelled by the inlet fan;

a combustor in which the pressurized air from the compressor is mixed with fuel and ignited for generating a stream of combustion gases; and a turbine for extracting energy from the combustion gases.

The hub may define one or more injection passages for directing injection air from the pump to one or more locations in the flow passage.

The one or more injection passages may comprise one or more respective openings formed in an outer surface of the hub for discharging the injection air.

The pump may comprise a plurality of rotor blades secured for common rotation with the inlet fan.

The pump may be configured to drive injection air to a root region of the one or more fan blades.

The pump may be configured to drive injection air to a location upstream of the one or more fan blades.

In a further aspect, the disclosure describes a method for influencing flow through a fan of a gas turbine engine. The method comprises:

receiving air into an interior of a nose cone;

increasing the pressure of the air in the interior of the nose cone and directing the pressurized air; and discharging the air into a flow passage defined by the fan.

The method may comprise discharging the air through one or more openings formed in an outer surface of a hub of the fan.

The method may comprise discharging the air to a root region of one or more fan blades of the fan.

The method may comprise discharging the air to a location upstream of one or more fan blades of the fan.

Further details of these and other aspects of the subject matter of this application will be apparent from the detailed description included below and the drawings.

DESCRIPTION OF THE DRAWINGS

Reference is now made to the accompanying drawings, in which:

FIG. 6 is a flowchart illustrating a method for influencing flow in a flow passage defined by a fan of a gas turbine engine.

DETAILED DESCRIPTION

The present disclosure relates to assemblies and methods for influencing flow through an inlet fan of a gas turbine engine by injecting air into the flow passage defined by the inlet fan. In some embodiments, the disclosed assemblies and methods may serve to provide (e.g., flow control) injection air to a root or other region(s) of one or more fan blades to influence the flow characteristics around the fan blades. In some situations, such influence on the flow characteristics may result in an improved performance and greater operating range for the fan by delaying the onset of flow separation and also contribute toward an improved overall performance of the gas turbine engine. In some situations, such influence on the flow may result in reduced fan vibration stress and noise.

In some embodiments, the disclosed assemblies and methods may be adapted to drive injection air for discharge into the flow passage defined by the inlet fan from within a nose cone of the gas turbine engine. Accordingly, the assemblies and methods disclosed herein may reduce or eliminate the need for routing high-pressure (and relatively expensive) air drawn from a downstream compressor of the gas turbine engine to the desired locations on the fan via relatively complex plumbing.

In some embodiments, the disclosed assemblies and methods may be adapted to supercharge a root region of the blades of the fan (i.e., fan inner core) by discharging injection air into the flow passage (e.g., upstream of the fan blades).

Aspects of various embodiments are described through reference to the drawings.

Figure 1:
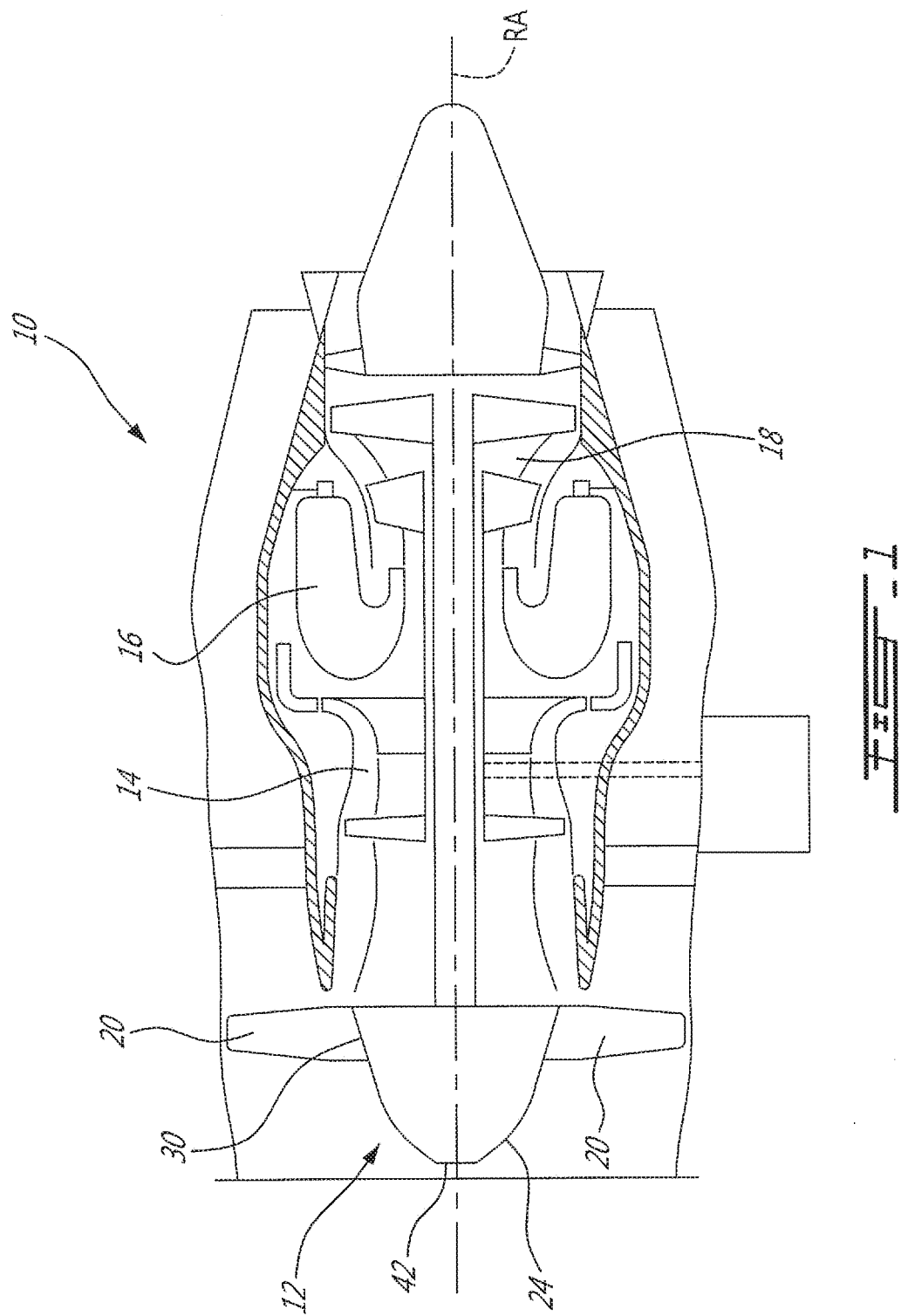
FIG. 1 shows an axial cross-section view of an exemplary turbofan gas turbine engine comprising a fan assembly as described herein.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 comprising one or more turbines for extracting energy from the combustion gases. Engine 10 may be suitable for use in aircraft applications. For example, engine 10 may be of the turbofan type. It is understood that aspects of the present disclosure may also be applicable to other types of gas turbine engines such as turbojet engines. Engine 10 may comprise a central axis of rotation RA about which one or more spools of engine 10 may rotate. In some embodiments, central axis of rotation RA may also correspond to (i.e., be coaxial with) a rotation axis of fan 12.

Figure 2:
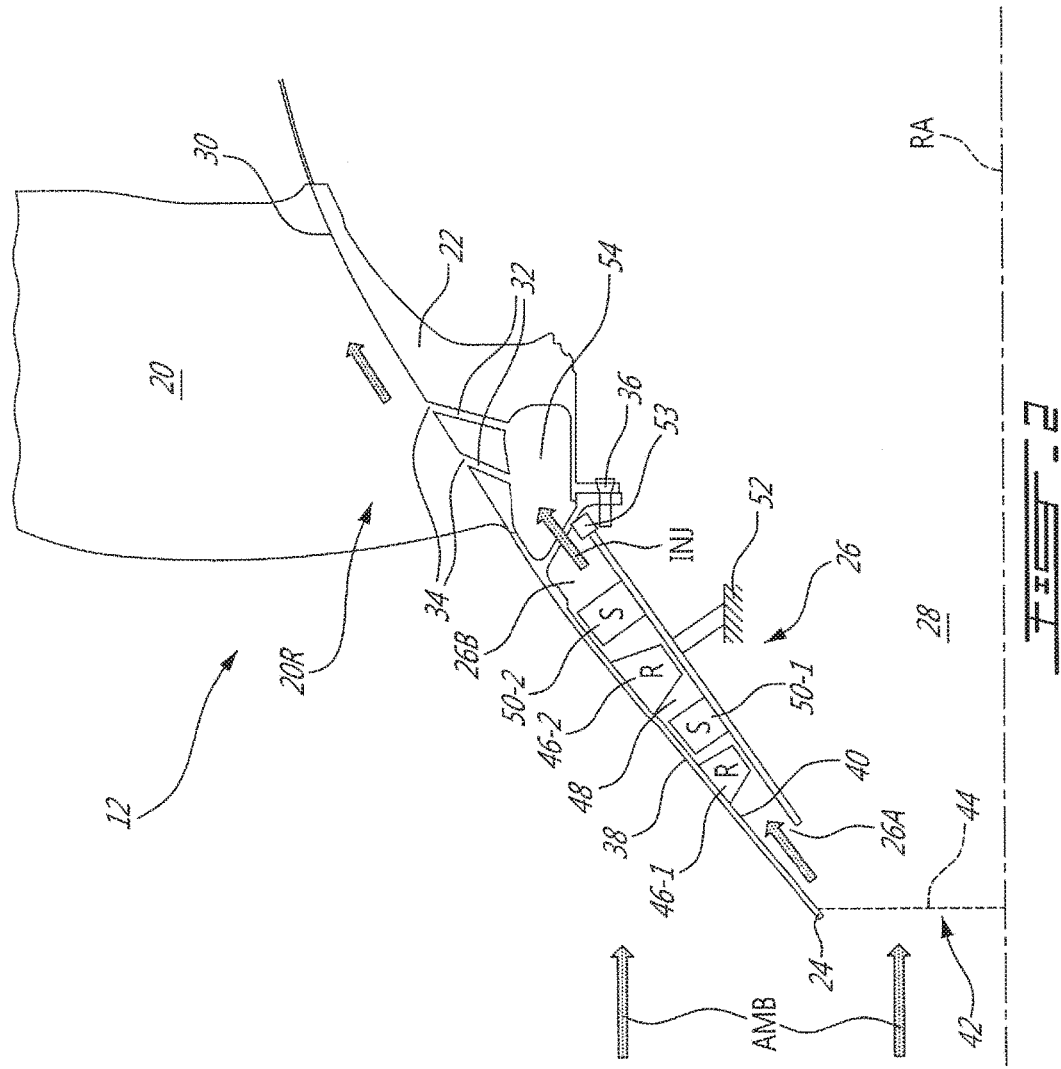
FIG. 2 shows a partial cross-section view of a schematic representation of an exemplary fan assembly of the engine of FIG. 1.

FIG. 2 shows a partial cross-section view of a schematic representation of fan 12 and nose cone 24 of engine 10 of FIG. 1. Nose cone 24 may be disposed upstream of hub 22 and coaxial therewith. Nose cone 24 may be secured to hub 22 for common rotation therewith and pump 26 may be at least partially housed in an interior 28 of nose cone 24. In various embodiments, fan 12 may comprise a plurality of circumferentially distributed fan blades 20 extending from hub 22. Fan 12 may be disposed at or near an inlet of engine 10 and may be considered an inlet fan. Fan blades 20 may be arranged as a circular array of radially extending fan blades 20 secured to hub 22. In some embodiments, fan blades 20 may be integrally formed with hub 22 as a unitary construction, or, fan blades 20 may comprise separately-formed components secured to hub 22 according to any suitable method. Each fan blade 20 may have a root region 20R located at or near an outer surface 30 of hub 22. Root region 20R may be considered a radially-inner portion of fan blade 20.

Fan blades 20 and hub 22 may define a flow passage extending through fan 12 and through which the ambient air AMB is propelled toward a core of engine 10 and/or toward a bypass duct of engine 10. The flow passage through fan 12 may be considered part of the gas path of engine 10. The flow passage may comprise one or more spaces defined between two adjacent fan blades 20 and extending radially from hub 22 to the tips of the adjacent fan blades 20. The flow passage may extend axially from a leading edge of one or more of fan blades 20 to a trailing edge of the one or more fan blades 20. In some embodiments, the flow passage may extend axially from a forward end of hub 22 to an aft end of hub 22 along axis of rotation RA. A radially-inner portion of the flow passage (i.e., at or near hub 22) may also be known as an "inner core" region of fan 12.

Hub 22 may be drivingly coupled to a shaft of engine 10 according to any suitable method for rotation about rotation axis RA. Hub 22 may define one or more injection passages 32 for directing injection air INJ to root region 20R of one or more of fan blades 20. The one or more injection passages 32 may comprise one or more respective discharge openings 34 formed in outer surface 30 of hub 22. The number and location of injection passages 32 illustrated in FIG. 1 are for example only and not intended to be limiting. The number and location(s) of the one or more openings 34 may be selected based on the flow characteristics around each fan blade 20 and on the desired influence to be achieved on the flow characteristics around each fan blade 20 at or near outer surface 30 of hub 22. For example, the number, location(s), geometry and discharge orientation(s) of the one or more openings 34 may be selected based on empirical information regarding the flow characteristics in root region 20R of fan blade 20 or based on numerical modeling information regarding the flow characteristics in root region 20R of fan blade 20. For example, the number and location(s) of the one or more openings 34 may be selected for flow injection at location(s) around root region 20R (e.g., suction side) of fan blade 20 that are more susceptible to flow separation in order to delay the onset of such flow separation in the root region 20R of fan blade 20 for performance and/or operating range improvements for example under one or more operating conditions. Injection passages 32 may comprise holes/jets formed into hub 22 using any suitable method such as, for example, being integrally formed into hub 22 during casting of hub 22 or by subsequent drilling.

Alternatively or in addition to openings 34 being formed in outer surface 30 of hub 22, injection passage(s) 32 may extend into fan blade(s) 20 and opening(s) 34 may be formed in a side wall of fan blade(s) 20 so that injection air INJ may be discharged in root region 20R or in other region(s) of fan blade(s) 20 but at a distance (e.g., radially outward relative to axis of rotation RA) from outer surface 30 of hub 22. In some embodiments, the location(s) of such opening(s) 34 formed in a side wall of fan blade(s) 20 may be closer to outer surface 30 of hub 22 than to a tip of fan blade(s) 20. Alternatively or in addition, pump 26 and injection passage(s) 32 may, for example, be used to direct injection air INJ to a tip region of fan blade(s) 20 where injection passage(s) 32 extend along fan blade(s) 20 or fan blade(s) 20 is/are hollow in order to influence the flow characteristics in the tip or other region(s) of the one or more fan blades 20.

Nose cone 24 may also be referred to as "inlet cone" or "fan spinner" of engine 10. Nose cone 24 may be integrally formed with hub 22 as a unitary construction, or, nose cone 24 may comprise a separately formed component or components (e.g., removably) secured individually or as an assembly to hub 22 according to any suitable method such as by a plurality of circumferentially-distributed fasteners 36. Nose cone 24 may comprise outer wall 38 providing an outer surface for interfacing with a free stream of ambient air AMB (e.g., ram air) entering engine 10 during flight or other mode(s) of operation of engine 10. In some embodiments, the outer surface of outer wall 38 of nose cone 24 may be substantially flush with outer surface 30 of hub 22 and may serve to direct the ambient air AMB into the inner core of fan 12.

Nose cone 24 may define interior 28 (i.e., an internal volume/space) at least partially enclosed by outer wall 38. In some embodiments, interior 28 of nose cone 24 may be at least partially defined by inside surface 40 of outer wall 38 of nose cone 24. Interior 28 of nose cone 24 may be in fluid communication with ambient air AMB and with the one or more injection passages 32 defined in hub 22. For example, interior 28 may be in fluid communication with the ambient air AMB via one or more apertures 42 formed in outer wall 38 of nose cone 24. In some embodiments, aperture(s) 42 may comprise a single aperture 42 centrally located in a forward-most and forward-facing location of nose cone 24. In the illustrated embodiment, ambient (e.g., ram) air AMB may enter nose cone 24 during flight of engine 10. Screen 44 may be disposed across aperture 42 for preventing foreign objects of certain sizes from entering interior 28 of nose cone 24 via aperture 42. Outer wall 38 of nose cone 24 may have an overall axisymmetric shape that is substantially coaxial with rotation axis RA of fan 12.

Pump 26 may be at least partially housed in interior 28 of nose cone 24. In some embodiments, pump 26 may be entirely housed in interior 28 of nose cone 24. Pump 26 may be configured to, using ambient air AMB received in nose cone 24 via aperture 42, drive injection air INJ through the one or more injection passages 32 defined in hub 22 to direct the injection air INJ to the root region 20R of the one or more fan blades 20. Pump 26 may comprise any suitable means for driving (e.g., propelling) a flow of air such as one or more impellers and/or one or more rotor blades (i.e., airfoils). For example, pump 26 may be configured to add energy to the ambient air AMB received in nose cone 24 in order to increase velocity and/or pressure of the ambient air AMB and produce one or more flows of injection air INJ. For example, pump 26 may be configured to pressurize the ambient air AMB and may be considered a compressor.

In some embodiments, pump 26 may comprise one or more movable rotor blades 46-1 and 46-2 (referred generically as "rotor blades 46") secured to a structure of nose cone 24 for common rotation with nose cone 24 and hence with fan 12. For example, the plurality of rotor blades 46 may be (e.g., directly) secured to inner surface 40 of outer wall 38 of nose cone 24. For example, rotor blades 46 may depend (e.g., extend radially inwardly) from inner surface 40 of outer wall 38 of nose cone 24 as shown in FIG. 2. In some embodiments rotor blades 46 may be made of the same or similar material(s) to that of nose cone 24. For example, rotor blades 46 may be made of a suitable aluminum-based alloy or titanium-based alloy.

In various embodiments, pump 26 may comprise one or a plurality of pressurizing stages in series where each stage comprise a circular array of rotor blades 46. The pressurizing stages may progressively pressurize the ambient air AMB between inlet 26A of pump 26 and outlet 26B of pump 26. Inlet 26A and outlet 26B may each have an annular shape where annular outlet 26B may have a larger nominal diameter than annular inlet 26A due to the generally conical shape of nose cone 24. Accordingly, pump 26 may defines a radially expanding annular flow passage extending from annular inlet 26A to annular outlet 26B and that is at least partially defined by inner surface 40 of outer wall 38 of nose cone 24.

The pressurization of ambient air AMB may cause an increase in temperature of the pressurized injection air INJ. The flow of pressurized air against the inside surface 40 of outer wall 38 may cause some heat to be transferred to outer wall 38 and provide some anti-icing protection for outer wall 38 of nose cone 24 depending on the amount of heat transferred thereto and associated temperatures.

In some embodiments, pump 26 may comprise a first circular array 46-1 of rotor blades 46 defining a first pressurizing stage and a second circular array 46-2 of rotor blades 46 defining a second pressurizing stage. The second circular array 46-2 of rotor blade 46 may be disposed downstream of the first circular array 46-1 of rotor blades 46 along annular passage 48. In some embodiments, pump 26 may comprise one or more stator guide vanes 50-1 and 50-2 (referred generically as "stator guide vanes 50") secured to a non-rotating structure 52 (e.g., stator) of engine 10. For example, pump 26 may comprise a first circular array 50-1 of stator guide vanes 50 disposed between first circular array 46-1 of rotor blades 46 and second circular array 46-2 of rotor blades 46. Pump 26 may comprise a second circular array 50-2 of stator guide vanes 50 disposed downstream of second circular array 46-2 of rotor blades 46 along annular passage 48. Rotor blades 46 and nose cone 24 may be considered a rotor portion of pump 26. Stator guide vanes 50 and associated structure may be considered a stator portion of pump 26. In some embodiments, non-rotating structure 52 may include or be indirectly secured to a casing of engine 10 for example. For example, non-rotating structure 52 may include a bearing housing (shown in FIG. 3). The stator portion of pump 26 may be sealed with the rotor portion of pump 26 or with hub 22 via a suitable seal 53 of any suitable type. In some embodiments, seal 53 may be a labyrinth seal.

In some embodiments, injection air INJ that is driven by pump 26 may be collected into collection chamber 54 upstream of the one or more injection passages 32. For example, collection chamber 54 may collect pressurized injection air INJ before it is distributed to the one or more injection passages 32. In some embodiments, collection chamber 54 may serve as a manifold for collecting and distributing injection air INJ to a plurality of injection passages 32. Collection chamber 54 may comprise a volume at least partially defined by hub 22. In some embodiments, collection chamber 54 may comprise a volume that is cooperatively defined by hub 22 and nose cone 24.

In various embodiments, the flow injection functionality described herein may be incorporated into new engines 10 or retrofitted into existing engines by, for example, replacing nose cone 24 and adding suitable injection passages 32 to hub 22.

Figure 3:
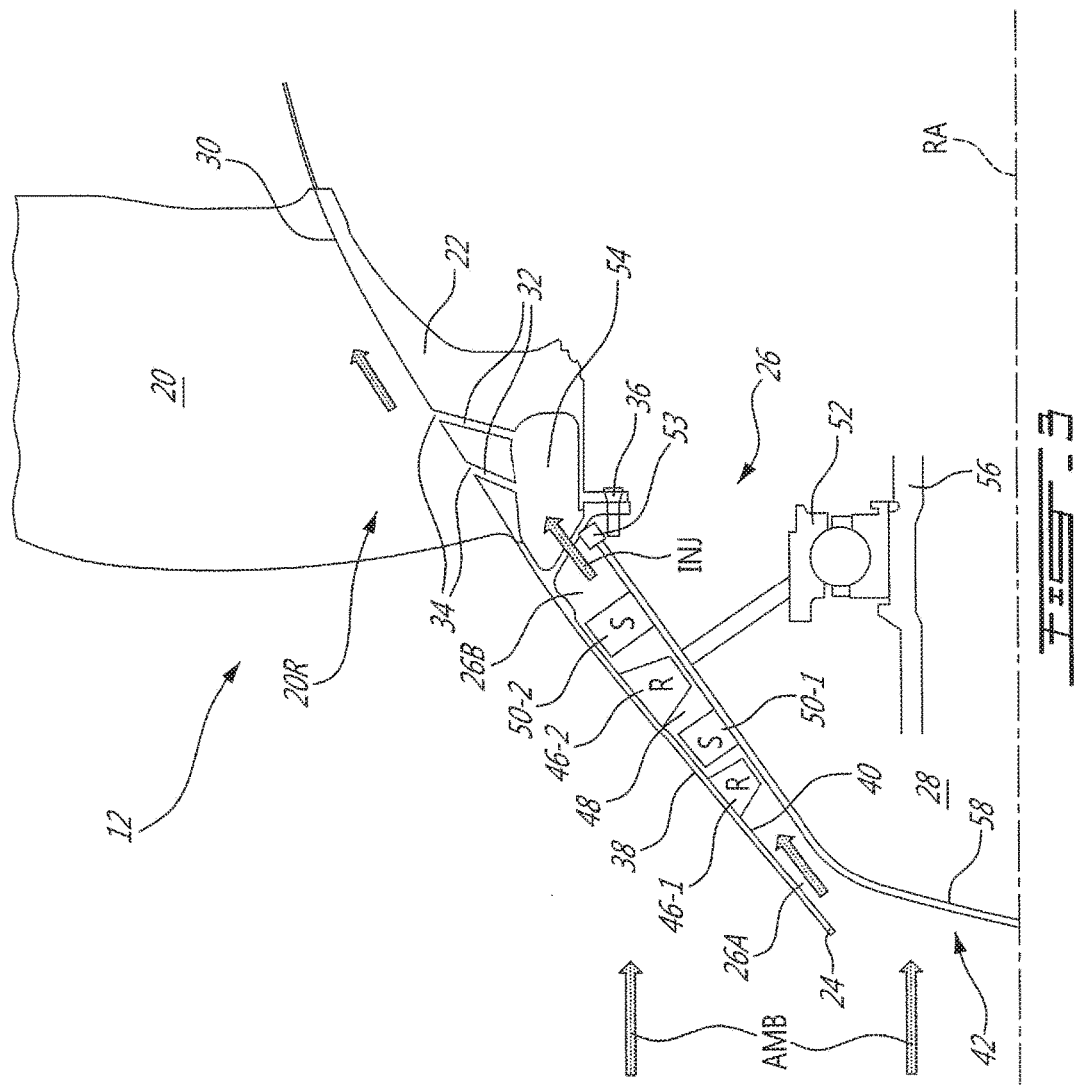
FIG. 3 shows a partial cross-section view of a schematic representation of another exemplary fan assembly of the engine of FIG. 1.

FIG. 3 shows a partial cross-section view of a schematic representation of another exemplary fan assembly of engine 10. The fan assembly of FIG. 3 has elements common with the fan assembly of FIG. 2 and their description is not repeated. Like elements are shown using like reference numerals. The fan assembly of FIG. 3 shows a stator portion of pump 26 as being secured to non-rotating structure 52 which is depicted as a bearing housing. The bearing associated with such housing may support low-pressure shaft 56 of engine 10. Hub 22 may be directly or indirectly secured to low-pressure shaft 56 for common rotation therewith. Alternatively, hub 22 may be drivingly coupled to low-pressure shaft 56 via a suitable (e.g., speed-reducing) gear box.

In various embodiments, the fan assembly of FIG. 3 may or may not comprise screen 44. In some embodiments, the stator portion of pump 26 may comprise inlet guide wall 58 for directing the free stream of ambient air AMB entering nose cone 24 via aperture 42 toward annular inlet 26A of pump 26. The use of inlet guide wall 58 may promote a more streamlined flow of ambient air AMB into pump 26, increased velocity of the ambient air AMB entering pump 26 and consequently promote increased velocity or pressure of injection air INJ being discharged by pump 26.

Figure 4:
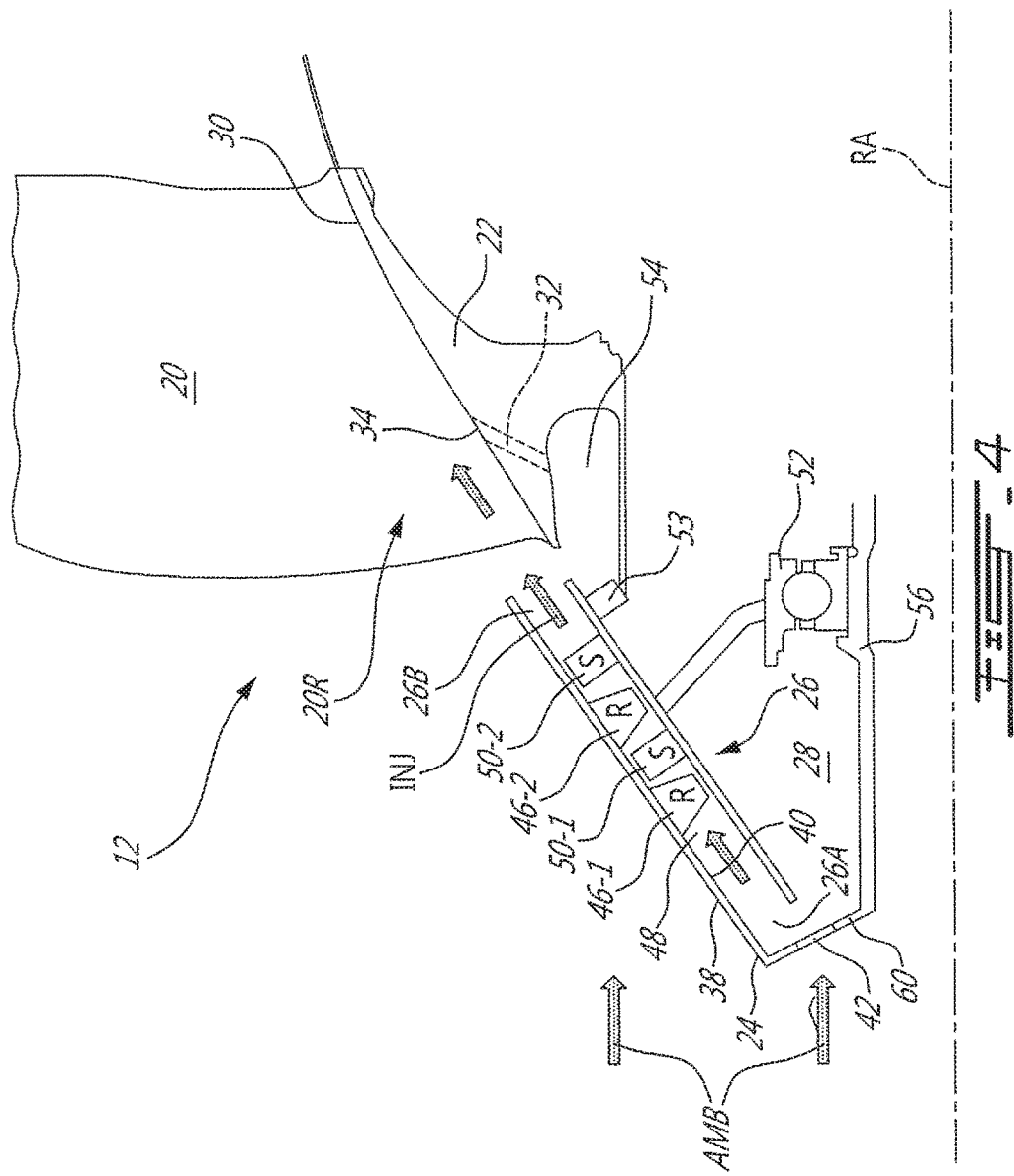
FIG. 4 shows a partial cross-section view of a schematic representation of another exemplary fan assembly of the engine of FIG. 1.

FIG. 4 shows a partial cross-section view of a schematic representation of another exemplary fan assembly of engine 10. The fan assembly of FIG. 4 has elements common with the fan assemblies of FIGS. 2 and 3 and their description is not repeated. Like elements are shown using like reference numerals. In various embodiments, the fan assembly of FIG. 4 may serve to supercharge the inner core of fan 12 and, optionally, also discharge flow control injection air INJ to locally influence the flow through the flow passage defined by fan 12. For example, pump 26 may be configured to drive an annular stream of injection air INJ directly to root region 20R of fan blades 20. Since the injection air INJ provided to the inner core of fan 12 may be of higher pressure than the ambient air AMB due to the action of pump 26, the injection air INJ may be considered to supercharge the inner core of fan 12. The supercharging of the inner core of fan 12 may, in some embodiments, promote increased overall core pressure of engine 10 and reduced specific fuel consumption of engine 10. From an aerodynamic point of view, the injection air INJ may, in some embodiments, improve flow characteristics in the root region 20R of fan blades 20 by promoting one or more of a higher Reynold number (i.e., less boundary layer build-up), a higher inlet pressure, a higher choke margin, a higher inlet temperature, a lower corrected speed and a lower relative Mach number. In some embodiments, injection air INJ may help lower energy losses through fan 12.

In some embodiments, pump 26 may be configured to deliver an annular stream of injection air INJ to a root region 20R of fan blades 20. The annular stream of injection air INJ may be discharged to a location upstream of fan blades 20 as shown in FIG. 4. For example, annular outlet 26B of pump 26 may be substantially aligned (e.g., streamlined) with the root region 20R of fan blades 20 so that the injection air INJ may be delivered from pump 26 to the inner core of fan 12 without significant changes in flow direction. Accordingly, in the embodiment shown, the outer surface of outer wall 38 of nose cone 24 may not necessarily be flush with outer surface 30 of hub 22. For example, the outer surface of outer wall 38 of nose cone 24 may be raised (i.e., offset) relative to outer surface 30 of hub 22 so that there is a radially inward step from the outer surface of outer wall 38 to outer surface 30 of hub 22.

The fan assembly of FIG. 4 shows a stator portion of pump 26 as being secured to non-rotating structure 52 which is depicted as a bearing housing supporting low-pressure shaft 56 of engine 10. Hub 22 may be drivingly coupled to low-pressure shaft 56 according to any suitable method. A rotor portion of pump 26 may also be drivingly coupled to low-pressure shaft 56. For example, outer wall 38 of nose cone 24 may be coupled to low-pressure shaft 56 via rotor coupling member 60 for common rotation with low-pressure shaft 56. Rotor coupling member 60 may define or accommodate one or more apertures 42 for communicating ambient air AMB into the interior 28 of nose cone 24.

As mentioned above, the fan assembly of FIG. 4 may optionally allow for some of the injection air INJ to additionally be driven through one or more injection passages 32 and discharged through one or more associated respective openings 34. In some embodiments, some of the injection air INJ driven by pump 26 may be directed into collection chamber 54, into injection passage(s) 32 and out of opening(s) 34 for local flow control in the flow passage defined through fan 12 the manner explained above.

Figure 5:
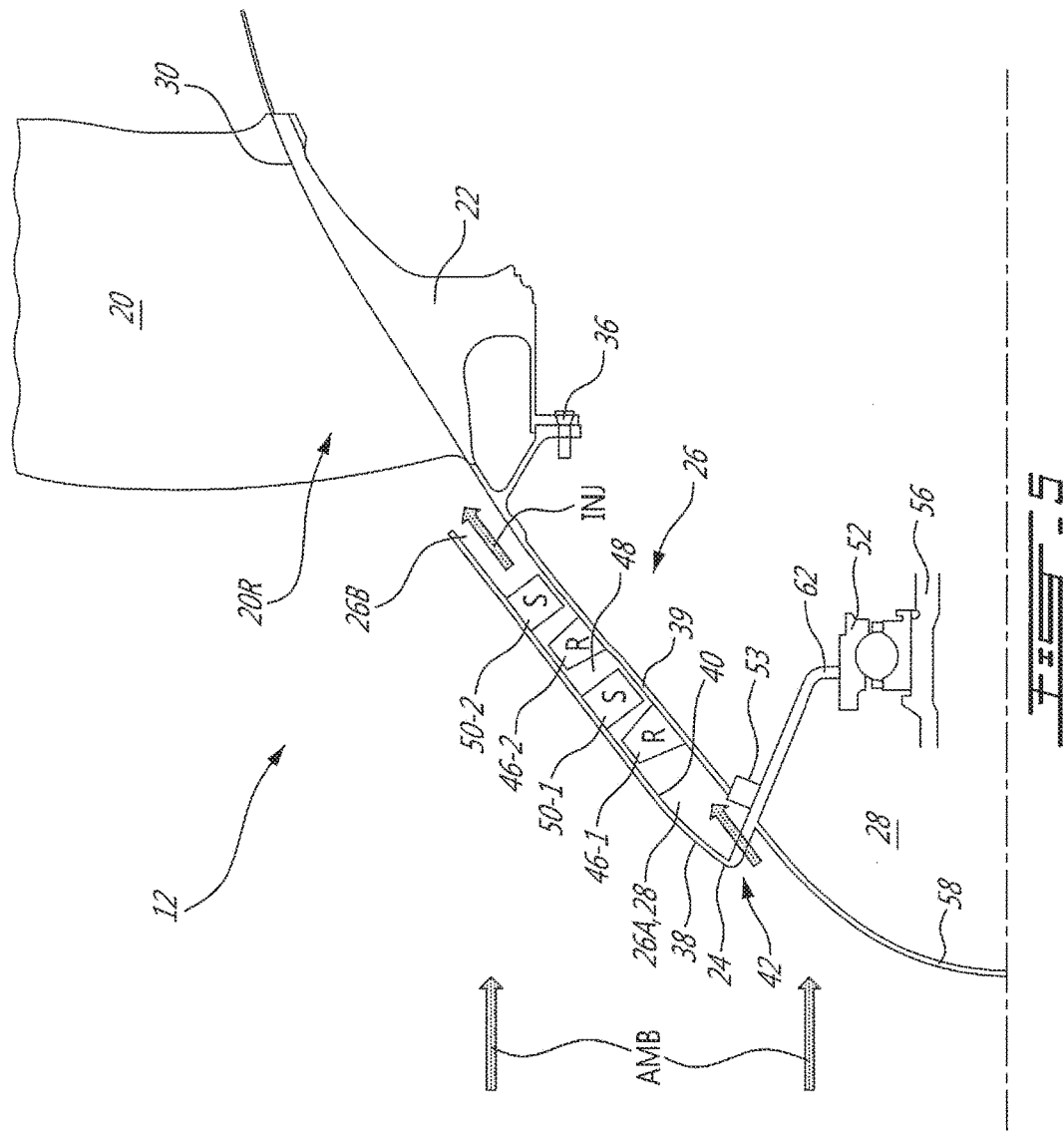
FIG. 5 shows a partial cross-section view of a schematic representation of another exemplary fan assembly of the engine of FIG. 1.

FIG. 5 shows a partial cross-section view of a schematic representation of another exemplary fan assembly of engine 10. The fan assembly of FIG. 5 has elements common with the fan assemblies of FIGS. 2, 3 and 4 and their description is not repeated. Like elements are shown using like reference numerals. In various embodiments, the fan assembly of FIG. 5 may serve to supercharge the inner core of fan 12 in a similar manner to the fan assembly of FIG. 4 where pump 26 is configured to drive an annular stream of injection air INJ directly to root region 20R of fan blades 20. The annular stream of injection air INJ may be discharged to a location upstream of fan blades 20.

In contrast with the fan assembly of FIG. 4, outer wall 38 of nose cone 24 may be part of a stator portion of pump 26 and inner wall 39 of nose cone 24 may be part of a rotor portion of pump 26. For example, stator guide vanes 50 may be secured to outer wall 38 of nose cone 24 and outer wall 38 may in turn be secured to non-rotating structure 52 via stator coupling member 62. On the other hand, rotor blades 46 may be secured to inner wall 39 of pump 26 and inner wall 39 may in turn be secured to hub 22 via fastener(s) 36 for common rotation with hub 22.

The embodiment of FIG. 5 may also comprise guide wall 58, which may also be secured to non-rotating structure 52 via stator coupling member 62. Guide wall 58 may direct the free stream of ambient air AMB toward one or more apertures 42 leading to annular inlet 26A of pump 26. Aperture(s) 42 through which ambient air AMB enters pump 26 may be formed in a stator portion of nose cone 24 so as to provide a non-rotating window through which ambient air AMB is received. In some embodiments, the flow of ambient air AMB received via non-rotating aperture(s) 42 may be cleaner as opposed to being received via one or more rotating apertures 42 as in the embodiment of FIG. 4. For example, pulsations or other disruptions in the flow of ambient air AMB received may be reduced with the use of non-rotating aperture(s) 42.

FIG. 6 is a flowchart illustrating a method 600 for influencing the flow in the flow passage defined by fan 12. Various embodiments of method 600 may be carried out by fan 12, nose cone 24 and pump 26 described above and illustrated in one or more of FIGS. 2, 3, 4 and 5 but it is understood that method 600 is not limited to the specific exemplary embodiments illustrated in FIGS. 2, 3, 4 and 5 and described herein. In various embodiments, method 600 may comprise: receiving air (e.g., ambient air AMB) into interior 28 of nose cone 24 (see block 602); increasing the pressure of the air (e.g., using pump 26) in interior 28 of nose cone 24 and directing the pressurized air (see block 604); and discharging the air (e.g., injection air INJ) in the flow passage defined by fan 12 to influence the flow in the flow passage (see block 606).

In various embodiments, discharging injection air INJ in the flow passage may comprise discharging injection air INJ to root region 20R or other region(s) of the one or more fan blades 20. In some embodiments, method 600 may comprise discharging injection air INJ to a location upstream of one or more fan blades 20. In some embodiments, method 600 may comprise using injection air INJ to supercharge the inner core of fan 12.

In some embodiments of method 600, discharging the air to root region 20R of the one or more fan blades 20 may comprise discharging the air through one or more openings 34 formed in an outer surface of hub 22 of fan 12.

In some embodiments of method 600, pressurizing the air (e.g., injection air INJ) may comprise using rotor blades 46 secured to a structure (e.g., inside surface 40) of nose cone 24 for common rotation with nose cone 24.

In some embodiments, method 600 may comprise pressurizing the air in interior 28 of nose cone 24 using a first pressurizing stage (e.g., rotor blades 46-1) and a second pressurizing stage (e.g., rotor blades 46-2) where both the first pressurizing stage and the second pressurizing stage are disposed in interior 28 of nose cone 24.

In some embodiments of method 600, directing the air may comprise directing the air against inner surface 40 of outer wall 38 of nose cone 24. In some embodiments of method 600, directing the air may comprise directing the air toward the flow passage defined by fan 12.

In some embodiments, method 600 may comprise receiving the air (e.g., injection air INJ) in collection chamber 54 prior to discharging the air.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. The present disclosure may be embodied in other specific forms without departing from the subject matter of the claims. Also, one skilled in the relevant arts will appreciate that while the assemblies and methods disclosed and shown herein may comprise a specific number of elements/components, the assemblies and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A fan assembly for a turbofan engine, the fan assembly comprising:
    a fan comprising a plurality of circumferentially distributed fan blades extending radially outwardly from a hub, the fan blades and a radially-outer surface of the hub defining a flow passage through which ambient air is propelled;
    a nose cone disposed upstream of the hub and having an interior in fluid communication with the ambient air; and
    a pump at least partially housed in the interior of the nose cone, the pump being configured to, using the ambient air in the nose cone, drive injection air into the flow passage defined by the fan blades and the radially-outer surface of the hub to influence flow in the flow passage; wherein:
        the pump includes a first stage including a first circular array of rotor blades and a second stage including a second circular array of rotor blades, the second stage being disposed downstream of the first stage; and
        the pump includes a circular array of stator guide vanes disposed between the first stage of rotor blades and the second stage of rotor blades.

2. The fan assembly as defined in claim 1, wherein the hub defines one or more injection passages for directing injection air from the pump to one or more locations in the flow passage.

3. The fan assembly as defined in claim 2, wherein the one or more injection passages comprise one or more respective openings formed in the radially-outer surface of the hub.

4. The fan assembly as defined in claim 1, wherein the rotor blades are secured for common rotation with the fan.

5. The fan assembly as defined in claim 4, wherein the rotor blades are secured to an inner surface of the outer wall of the nose cone.

6. The fan assembly as defined in claim 2, wherein the hub at least partially defines a collection chamber for receiving the injection air from the pump, the collection chamber being disposed upstream of the one or more injection passages.

7. The fan assembly as defined in claim 1, wherein the pump defines an annular flow passage that is at least partially defined by an inner surface of the outer wall of the nose cone.

8. The fan assembly as defined in claim 1, wherein the pump is configured to drive injection air to a root region of the one or more fan blades.

9. The fan assembly as defined in claim 1, wherein the pump is configured to drive injection air to a location upstream of the one or more fan blades.

10. A gas turbine engine comprising:
    an inlet fan for propelling ambient air, the inlet fan comprising a plurality of circumferentially distributed fan blades extending radially outwardly from a hub, the fan blades and a radially-outer surface of the hub defining a flow passage through which ambient air is propelled;
    a nose cone disposed upstream of the hub and having an interior in fluid communication with the ambient air; and
    a pump at least partially housed in the interior of the nose cone, the pump being configured to, using the ambient air in the nose cone, drive injection air into the flow passage defined by the fan blades and the radially-outer surface of the hub to influence flow in the flow passage, the pump having a first stage including a first circular array of rotor blades and a second stage including a second circular array of rotor blades, the second stage being disposed downstream of the first stage, the pump including a circular array of stator vanes disposed between the first stage of rotor blades and the second stage of rotor blades;
    a compressor for pressurizing the air propelled by the inlet fan;

a combustor in which the pressurized air from the compressor is mixed with fuel and ignited for generating a stream of combustion gases; and a turbine for extracting energy from the combustion gases.

11. The gas turbine engine as defined in claim 10, wherein the hub defines one or more injection passages for directing injection air from the pump to one or more locations in the flow passage.

12. The gas turbine engine as defined in claim 11, wherein the one or more injection passages comprise one or more respective openings formed in the radially-outer surface of the hub for discharging the injection air.

13. The gas turbine engine as defined in claim 10, wherein the rotor blades are secured for common rotation with the inlet fan.

14. The gas turbine engine as defined in claim 10, wherein the pump is configured to drive injection air to a root region of the fan blades.

15. The gas turbine engine as defined in claim 10, wherein the pump is configured to drive injection air to a location upstream of the fan blades.

16. A method for influencing flow through a fan of a gas turbine engine, the method comprising:

receiving air into an interior of a nose cone;

increasing the pressure of the air in the interior of the nose cone and directing the pressurized air using a pump at least partially housed in the interior of the nose cone, the pump having a first stage including a first circular array of rotor blades, a second stage disposed downstream of the first stage and including a second circular array of rotor blades, and a circular array of stator vanes disposed between the first stage of rotor blades and the second stage of rotor blades; and discharging the pressurized air into a flow passage defined by a radially-outer surface of a hub and fan blades extending radially outwardly from the hub.

17. The method as defined in claim 16, comprising discharging the pressurized air through one or more openings formed in the outer surface of the hub of the fan.

18. The method as defined in claim 16, comprising discharging the pressurized air to a root region of the fan blades of the fan.

19. The method as defined in claim 16, comprising discharging the pressurized air to a location upstream of the fan blades of the fan.

\* \* \* \* \*